United States Patent [19]
Dombek et al.

[11] Patent Number: 5,350,506
[45] Date of Patent: Sep. 27, 1994

[54] ANTI-DRAIN FLUID FILTER

[75] Inventors: Bruce B. Dombek, Roselle; Theodore F. Boone, Tinley Park, both of Ill.

[73] Assignee: Navistar International Transporation Corporation, Chicago, Ill.

[21] Appl. No.: 828,330

[22] Filed: Jan. 30, 1992

[51] Int. Cl.5 .............................................. B01D 27/10
[52] U.S. Cl. ..................... 210/136; 210/235; 210/429; 210/440; 210/DIG. 17
[58] Field of Search ........ 210/136, 234, 235, DIG. 17, 210/429, 435, 440, 444, 430, 443, 168; 251/149.1, 149.2, 149.3, 331

[56] References Cited

U.S. PATENT DOCUMENTS

| | | | |
|---|---|---|---|
| 3,388,801 | 6/1968 | Boyd et al. | 210/234 |
| 3,557,958 | 1/1971 | Baldwin | 210/136 |
| 3,589,517 | 6/1971 | Palmai | 210/130 |
| 3,608,726 | 9/1971 | Crowther | 210/234 |
| 3,774,764 | 11/1973 | Baldwin | 210/136 |
| 4,052,307 | 10/1977 | Humbert, Jr. | 210/235 |
| 5,030,345 | 6/1991 | Thomas | 210/248 |
| 5,049,269 | 9/1991 | Shah | 210/234 |

FOREIGN PATENT DOCUMENTS 2235837  1/1974  Fed. Rep. of Germany ...... 210/136

*Primary Examiner*—Matthew O. Savage
*Attorney, Agent, or Firm*—Dennis K. Sullivan

[57] ABSTRACT

A fluid filter, particularly adapted for use in non-vertical header mount arrangements, has an inlet thereinto and an outlet therefrom, both of which are valved to create a closed filter shell upon removal of the filter from the header. The outlet valve is opened by engagement of the filter on a header spud therefor and the inlet valve is opened by pressurized oil being presented thereto.

14 Claims, 1 Drawing Sheet

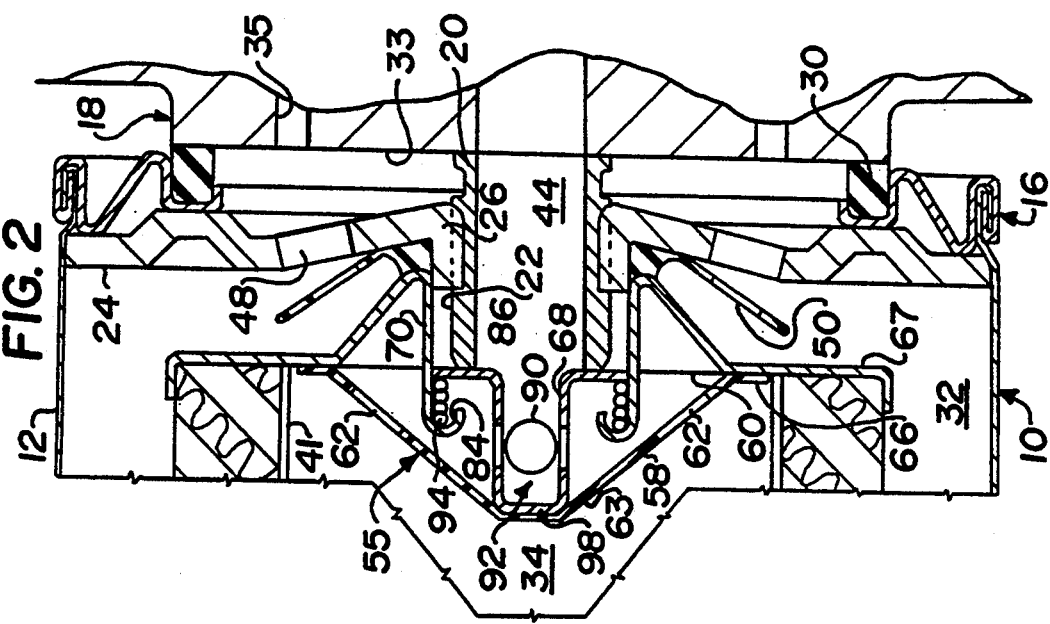
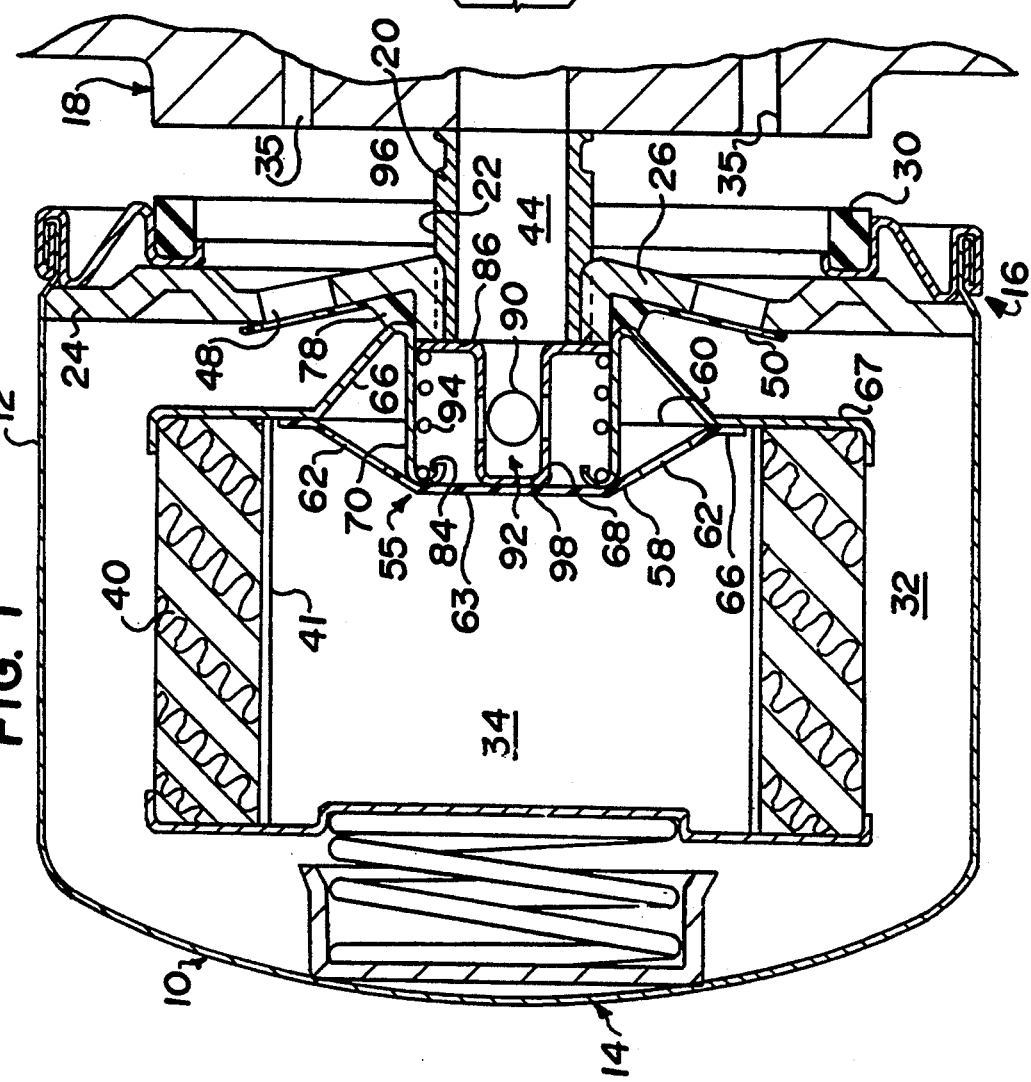

ANTI-DRAIN FLUID FILTER

BACKGROUND OF THE INVENTION

The present invention relates to a fluid filter of the spin-on type, such as an engine lubricating oil, fuel, or coolant filter, which has a one-way check valve in the inlet thereinto and a spring-biased, normally-closed outlet valve which is automatically opened upon installation of the filter on an associated header assembly and automatically closed upon removal therefrom, thereby providing a filter which does not drain when removed for replacement. The filter is particularly suited for applications where a non-vertical mounting is required or where contaminated fluid within the filter must be contained for environmental protection.

THE PRIOR ART

Heretofore, fluid filters having anti-drainback valves at its inlet has been proposed. For example, Baldwin U.S. Pat. No. 3,557,958 discloses an anti-drainback valve for oil filters, the valve functioning to prevent oil within the filter from draining back to the oil reservoir through the filter inlet when the engine, as well as the oil pump, are not operating and thereby providing an adequate supply of oil to the engine upon starting. The valve comprises a base plate acting as a valve seat, an adapter bushing, an annular rubber valve element for controlling the back flow of oil through openings in the base plate, and a spring for normally maintaining the valve member seated. In Baldwin U.S. Pat. No. 3,774,764, the anti-drainback valve is fashioned as a rubber preform having the configuration of an upright truncated cone which covers the openings in the base plate.

However, although such anti-drainback valves would also operate to prevent leakage of the oil through the inlet upon removal of the filter from its header, they would not prevent leakage through the outlet and, in any case, were not developed to deal with leakage during removal of the header but rather deal with drainback of oil through the engine oil supply line when the engine is not operated.

SUMMARY OF THE INVENTION

Accordingly, it is a primary object of the anti-drainback fluid filter described and claimed herein is to provide a filter which minimizes leakage therefrom upon removal from an associated header.

Another object of the anti-drainback fluid filter is to provide a filter which seals itself when removed from the header.

A more specific object of the anti-drainback fluid filter is to provide a filter having an inlet which is normally maintained closed by a flapper valve and having a spring-biased, normally-closed outlet valve which is opened upon installation of the filter onto the header.

These objects are specifically met in an anti-drain fluid filter incorporating a one-way elastomeric flapper valve disposed in a normally-closed position in the inlet side of the filter and a spring-biased, normally-closed valve in the outlet which is mechanically opened by engagement of the filter onto the tubular mounting stud or spud of a filter header, and which closes automatically upon disengagement therefrom.

BRIEF DESCRIPTION OF THE DRAWINGS

Other objects and advantages of the invention will become more apparent upon perusal of the detailed description thereof and upon inspection of the drawings, in which:

FIG. 1 is a longitudinal cross-section, having a medial portion removed, of a fluid filter constructed in accordance of the present invention partially engaged on the spud of a filter header and showing the inlet and outlet valves of the filter in a closed position; and FIG. 2 is a longitudinal cross section of a portion of the fluid filter of FIG. 1 showing the filter fully engaged to the header and the inlet and outlet valves in an open position.

DESCRIPTION OF THE PREFERRED EMBODIMENT

Referring now to the drawings in greater detail, there is illustrated therein an anti-drain fluid filter 10 of the present invention mounted on a filter header partially shown at 18 of a conventional type such as described in SAE Recommended Practice published by the Society of Automotive Engineers entitled FILTER BASE MOUNTING—SAE J363 FEB87, which may be integrally formed on an associated structure, such as an engine crankcase, or which may comprise a separate header assembly. The header 18 includes a center tubular mounting stud or spud or pipe 20 having an uninterrupted planar axial end surface thereon which forms the header inlet and which is threaded on an exterior surface 22 thereof to mount the filter 10 to the header.

The fluid filter 10 may be an engine lubricating oil filter or a fuel filter but in the particular embodiment shown is an engine coolant filter. The filter 10, which is of the spin-on type, comprises a cylindrical shell 12 having a closed end 14 and a header engaging end assembly 16 comprising a metal base plate 24 extending thereacross and including an inwardly directed annular threaded flange 26 which engages onto the center spud 20, the spud 20 extending into the filter shell 12 when the filter 10 is spun onto the spud 20. An annular elastomeric gasket 30 is provided on the end assembly 16 to seal the filter 10 against the header 18.

Within the filter shell 12 are defined an outer annular inlet channel 32 and a central outlet passage 34 which are separated from each other by a cylindrical filter element 40 which rests against a perforated center tube 41, the center tube 41 maintaining the shape of the filter element 40. Inlet channel 32 aligns with an annular passage 33 formed between the spud 20 of the header 18 and the elastomeric gasket 30 of the filter 10 when installed on the header, the passage 33 being filled from one or more outlets 35 of the header 18.

A fluid to be filtered enters the inlet channel 32 from the passage 33 between the filter 10 and the header 18, filters through the filter element 40 and center tube 41 and enters the outlet passageway 34 to return to the engine (not shown) via a central inlet 44 formed by the header spud 20. The annular passage 33 and the inlet channel 32 in the filter 10 communicate via an array of ports 48 disposed in the base plate 24 of the filter 10 circumferentially about the spud 20.

To provide a means of maintaining the ports 48 and the inlet side 32 of the filter normally closed, a flapper valve 50 comprising an annular elastomeric disk-like member disposed about the spud 20 in overlaying relation to the ports 48 within the shell 12 as shown in FIG. 1. As shown in FIG. 2, the flapper may be in an open position when fluid is supplied under pressure through the ports 48 and will close due to the elastomeric bias of the flapper when no pressure is in ports 48.

In the filter 10 of the present invention not only is the inlet 32 valved, but the outlet passage 34 is also valved to a normally-closed configuration by providing a valve assembly 55 therein. The normally-closed outlet valve assembly 55 includes an elastomeric diaphragm 58 which encloses the bottom portion 60 of the outlet passage 34. The diaphragm 58 has a plurality of ports 62 therethrough located adjacent the outer periphery 66 of the diaphragm 58 but is imperforate in its central portion 63.

The valve assembly 55 further includes a modified filter end cap 67 and a spacer sleeve or valve member 68 which is slidingly disposed within a central annular collar 70 formed by an inturned portion of the end cap 67 having a diameter larger than the spud and which preferably engages and is fixed to the flange 26 of base plate 24 to stabilize the filter element 40 and abuts against a base portion 78 of the flapper valve 50, securing the position thereof. The collar 70 terminates in an inwardly curved end portion 84, with the central portion 63 of the diaphragm 58 engaged thereagainst so that the ports 62 in the diaphragm are positioned radially outwardly of the curved end portion 84 of the collar 70.

Slidably engaged within the collar 70 is the cylindrical spacer sleeve 68 having a radial end flange 86 at an outlet end thereof and having a closed opposite end 98 disposed to engage the central portion 63 of the diaphragm 58. Ports 90 are provided in the wall of the sleeve 68 leading to a hollow core 92 therewithin. This hollow core 92 aligns with and empties into the inlet 44 in the header spud 20. The ports 90 and hollow core 92 together form a passage for permitting fluid to flow from the central outlet passage 34 into the mounting spud 20 when the valve member 68 is in contact with the spud. The spacer sleeve 68 is further biased by a spring 94 engaged between the spacer sleeve end flange 86 and the curved end portion 84 of the collar 70, to bias the end flange 86 of the spacer sleeve 68 against an inner end 96 of the flange 26 when the filter 10 is unmounted. Closed end 98 of the spacer sleeve 68, when unmounted, lies in the same plane with the curved ends 84 of the collar 70, and rests against the center portion 63 of the diaphragm 58.

The end flange 86 of the spacer sleeve 68 extends radially inward of the flange 26 and is thus disposed to be moved by the header spud 20 when the filter 10 is mounted onto the header 18.

With all elements of the filter 10 in the configuration just described, the inlet 32 and outlet passage 34 are sealed, creating an anti-drain fluid filter 10 which will not allow any fluid therein to escape therefrom, until the filter is mounted onto the header 18. However, upon the filter 10 being threadedly engaged onto the header spud 20, the header spud 20 incrementally pushes the spacer sleeve 68 into the diaphragm 58 center, causing the diaphragm 58 to stretch inwardly so that the diaphragm 58 is no longer engaged against the curved end portion 84 of the collar 70 and a fluid path from the outlet passage 34 through the ports 62 in the diaphragm 58, around the end of collar 70, and through the ports 90 in the spacer sleeve 68 is created, opening communication with the inlet 44 into the header 18.

Opening of the outlet passage 34 creates a drop in pressure within the filter 10, and when pressurized fluid is present in the header outlet ports 35 and annulus 33 is presented to ports 48, the fluid pushes the flapper valve 50 away from engagement over inlet ports 48 creating a complete fluid path through the filter 10. When no pressure is present, flapper valve 50 closes, preventing drainback from the filter 10.

When the filter 10 is removed from the header 18, the spacer sleeve 68 returns under the influence of spring 94 to its position abutting the flange 26, thus positioning the collar 70 against the diaphragm 58 and thereby closing off communication between the diaphragm ports 62 and the spacer sleeve ports 90.

As described above, the fluid filter of the present invention has a number of advantages, some of which have been described above and others of which are inherent in the invention. It will be apparent to those of ordinary skill in the art that modifications and alterations can be made to the filter, for example, to the outlet valve, without departing from the teachings herein. Accordingly, the scope of the invention is only to be limited as necessitated by the accompanying claims.

What is claimed is:

1. An anti-drain fluid filter adapted to be mounted to a filter header comprising a cylindrical housing having a fluid entrance and a fluid exit, a cylindrical filter element disposed in the housing in a manner dividing the housing into an inlet passage communicating with said entrance and an outlet passage communicating with said exit, a one-way inlet valve disposed at said entrance into said housing to said inlet passage, said inlet valve permitting fluid entry thereinto while preventing the exit of fluid therefrom, and a spring-biased, normally-closed outlet valve disposed adjacent said exit from said filter element and normally preventing fluid flow therefrom, said outlet valve including cooperative means responsive to the configuration of said header for automatically opening said outlet valve upon installation of the filter on said header and establishing a continuous fluid passage from said filter element exit to said header, said outlet valve comprising an elastic diaphragm enclosing the outlet passage and normally abutting an annular shoulder disposed on the opposite side of said diaphragm from said outlet passage in fixed position about said exit from said housing, said diaphragm having openings therethrough which are disposed thereabout in a circular array radially outward of said annular shoulder, and means for displacing said diaphragm from said annular shoulder upon installation of said filter on said header.

2. The filter of claim 1 wherein said diaphragm displacing means includes a hollow cylindrical spacer sleeve slidingly engaged within said annular shoulder and having a closed end in contact with said diaphragm and an open end thereof, said spacer sleeve being biassed to a position permitting said diaphragm to engage said annular shoulder.

3. The filter of claim 2 wherein said spacer sleeve is positioned to be engaged and moved against said diaphragm, upon installation of said filter on said header, by a spud on said header, said spud causing said diaphragm to deflect away from said annular shoulder.

4. The filter of claim 2 wherein the periphery of said sleeve adjacent said closed end has ports therein.

5. In combination with a filter header having a standard centrally disposed tubular mounting spud thereon for attaching a filter thereto, said spud being an exteriorly threaded pipe having a uninterrupted planar axial end surface over which said filter may be threadedly engaged, an anti-drain fluid filter comprising a spin-on housing having a threaded base plate threadedly engaged to said spud and containing a filter element dividing said spin-on housing between an inlet path valved by means of a flapper anti-drainback valve disposed within said housing adjacent said base plate and an outlet passage having a normally-closed outlet valve assembly operatively disposed between said base plate and said filter element within said housing, the normally-closed outlet valve assembly including a valve member which is axially shiftable along said axis between positions in which said valve assembly is open and closed, said valve member being disposed to be moved to said open position by engagement thereof with the header mounting spud during engagement of the falter on said header, said valve member incorporating a permitting fluid flow from said outlet passage into said mounting spud when said valve member is in contact with said spud.

6. The combination of claim 5 wherein said filter housing base plate has a central tubular structure threadedly engaged with said header spud and extending to an open filter element end within the housing, and said outlet valve assembly includes a cylindrical sleeve slidingly disposed within said central tubular structure, said cylindrical sleeve having a closed end at the filter element end, an end open to said filter header, and a port in the cylindrical periphery thereof and having a range of movement, in response to the position of said spud during installation, between a normally-closed position with said port disposed within said tubular structure and an open position partially extended from said tubular structure with said port establishing fluid communication between said outlet passage of said filter and said spud.

7. The combination of claim 6 wherein said outlet valve assembly further includes a diaphragm disposed between said filter element and said cylindrical sleeve, said diaphragm extending across the outlet passage of said filter element in contact with said filter element end of said tubular structure and having a circular array of ports therein positioned radially outwardly of the tubular structure.

8. An anti-drain fluid filter adapted to engage a standard mounting spud projecting from a filter header, said spud being an exteriorly threaded tube having a planar axial end surface over which said filter may be engaged, comprising:

a cylindrical housing having an axis, a closed end, and a base plate permanently attached to and enclosing an opposite end of said housing, said base plate having a threaded central aperture for threadedly engaging said mounting spud and a plurality of inlet apertures radially displaced from said central aperture;

filter element means disposed within said housing and dividing said housing between an inlet passage extending between an inlet side of said filter element means and said inlet apertures and an outlet passage extending between a side of said filter element means opposite said inlet side and said threaded aperture;

a flapper valve disposed in said inlet passage within said housing adjacent to and closing said base plate inlet apertures, said flapper valve being movable to an open position upon the presence of fluid pressure at said apertures; and a normally-closed outlet valve assembly disposed within said housing in said outlet passage, said normally-closed outlet valve assembly including a valve member which is axially shiftable along said axis between a closed position and an open position inwardly displaced into said housing from said closed position, said valve member being disposed to be maintained in said open position by contact of said end surface of said header mounting spud therewith upon engagement of the filter on said header, said valve member incorporating a passage permitting fluid flow from said outlet passage through said base plate aperture upon said valve member being maintained in said open position.

9. The filter of claim 8 wherein said filter housing base plate includes a central tubular structure adapted to receive said header spud and extending to an open filter element end within the housing, and said valve member includes a cylindrical sleeve slidingly disposed within said central tubular structure, said cylindrical sleeve having a closed end at the filter element end, an end open to said filter header, and a port in the cylindrical periphery thereof and having a range of movement, in response to the position of said spud during installation, between a retracted position with said port disposed within said tubular structure and an open position partially extended from said tubular structure with said port establishing fluid communication between said outlet passage of said filter and said spud.

10. The filter of claim 9 further including a spring operatively disposed between said tubular structure and said cylindrical sleeve for biassing said sleeve to said retracted position.

11. The filter of claim 10 wherein said outlet valve assembly further includes a diaphragm disposed between said filter element and said cylindrical sleeve said diaphragm extending across the outlet passage in contact with said filter element end of said tubular structure and having a circular array of ports therein positioned radially outwardly of the tubular structure.

12. The filter of claim 11 wherein said closed end of said cylindrical sleeve in its open position abuts against said diaphragm.

13. The filter of claim 12 wherein said tubular structure having a curved inlet end, said diaphragm resting thereagainst upon said outlet valve assembly being in its normally-closed position.

14. The filter of claim 13 wherein said cylindrical sleeve has a plurality of circumferential ports therein.

* * * * *